Patented Mar. 4, 1924.

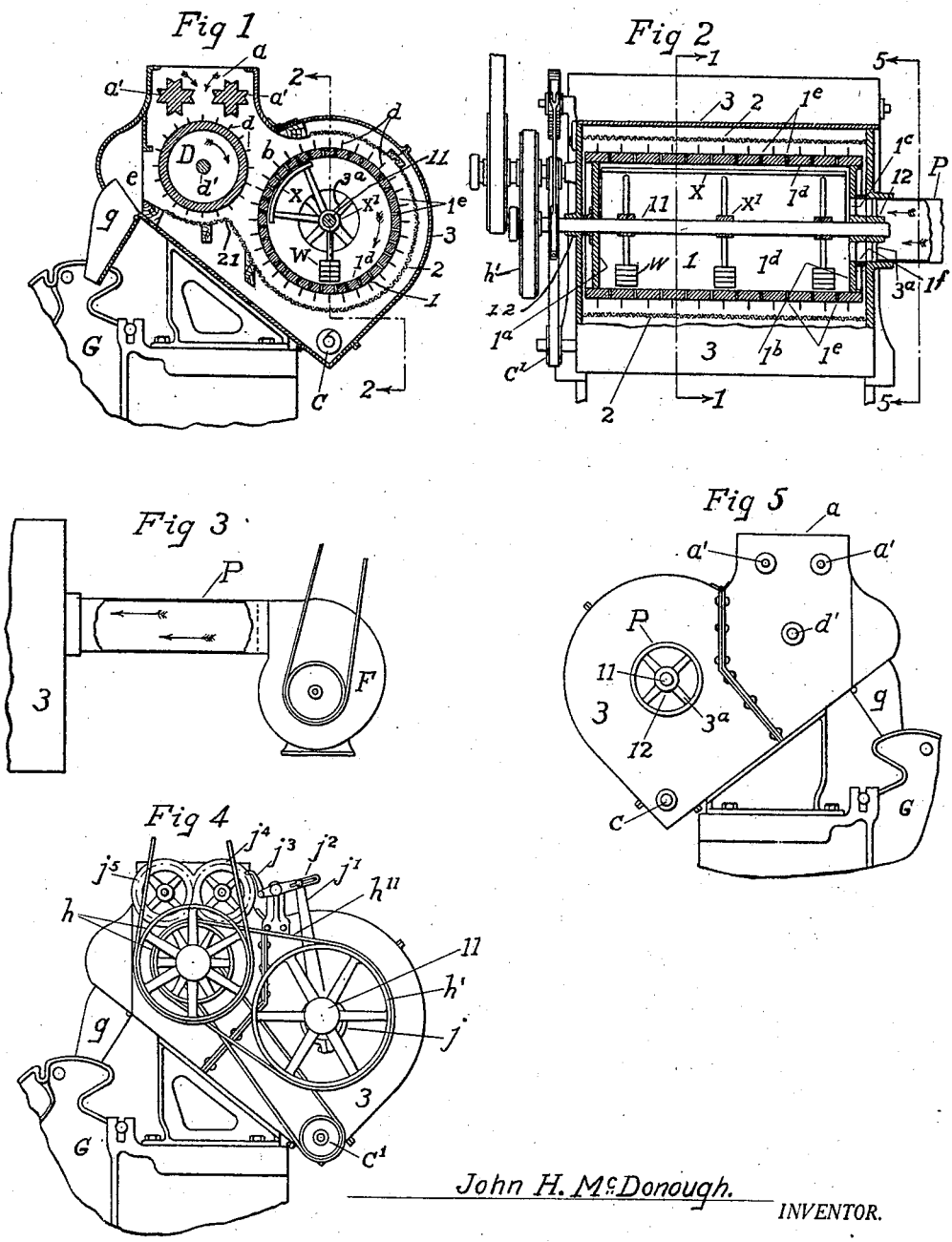

1,485,402

UNITED STATES PATENT OFFICE.

JOHN H. McDONOUGH, OF DALLAS, TEXAS, ASSIGNOR TO THE MURRAY COMPANY, OF DALLAS, TEXAS, A CORPORATION OF TEXAS.

COTTON CLEANER.

Application filed May 26, 1923. Serial No. 641,750.

*To all whom it may concern:*

Be it known that I, JOHN H. McDONOUGH, a citizen of the United States, residing at Dallas, in the county of Dallas and State of Texas, have invented certain new and useful Improvements in Cotton Cleaners, of which the following is a specification.

My invention is a beater drum, especially adapted for use in cotton cleaners, and consists in combining a hollow beater drum or drums, in such a mechanism, having perforations in the peripheral walls or surface of the drum or drums, with the delivery side of an air fan, so that the air current generated by the air fan may be introduced into the drum and pass through the peripheral perforations in a multiplicity of air streams.

In the drawings:

Figure 1 is a cross-sectional elevation of my improved cotton cleaner, on line 1—1 of Figure 2;

Figure 2 is a longitudinal sectional elevation of my improved cotton cleaner, on line 2—2 of Figure 1;

Figure 3 is a detail on a slightly reduced scale of the air connection;

Figure 4 is an end elevation, showing the actuating mechanism;

Figure 5 is a cross-section on line 5—5 of Figure 2.

The operation of a feeder or feeder-cleaner for cotton gins, is well known in the art and need not be described at length.

In Figure 1 is shown a cleaner feeder, consisting of a drum, D, having upon its surface a multiplicity or spikes, $d$. This drum is set beneath a pair of feed rolls, $a'$, mounted above the drum D, in a passage, $a$. The drum D and feed rolls, $a'$, rotate as indicated by the arrows. The seed cotton is passed between the feed rolls, $a'$ $a'$, and is compressed slightly and formed into a loose bat, which as it descends is received by the beater drum D and the cotton carried around by the spikes, $d$. The shaft, $d'$, of the drum D and the feed rolls, $a'$, are provided with actuating pulleys and gears, outside the casing, by means of which they are actuated from a source of power, all as is well known. To one side of the drum D is arranged a second drum or drums, 1, within a screened casing 2, 3, the screen being indicated by 2 and the casing by 3. Drum 1 is carried on shaft 11 carried in bearings 12, the bearing at one end mounted in a spider $3^a$, in an opening in the side of casing 3. One end of the drum 1 is closed by a head, $1^a$, while the other end has a head $1^b$ having an opening, $1^c$, coincident with the opening of the spider $3^a$ in the casing 3. The peripheral walls, $1^d$, of the drum are perforated as at $1^e$.

Connected to the outer casing 3 and surrounding and enclosing the spider $3^a$ is an air pipe P leading from the delivery side of an air fan, F, adapted to generate a swiftly moving air current through the pipe P, drum 1 and perforations $1^e$.

A shield X, preferably covers that portion of the inner surface of the drum, 1, which is opposite the throat, $b$, and prevents the passage of air through those perforations, $1^e$, which are covered by the shield. As soon as the cotton which is deposited on the outer surface of drum 1, passes above that shield, air from within the drum, which has entered drum 1 through pipe P, passing spider $3^a$ and opening $1^c$, is emitted through perforations $1^e$ beneath the cotton and tends to lift and open and hold it against the screen 2, the air passing through the cotton and the screen, carrying dust and trash from the cotton. The screen 2 is preferably so spaced from the drums that the cotton cannot be forced by the swiftly moving air, beyond the reach of the spikes, $d$. The cotton is pushed along by the spikes, $d$, and held against the screen 2 by the air currents, until it reaches a point 21 between drums, when the cotton passes to the under side of drum D and is pushed to the exit, $e$, and the chute $g$, down which it passes to the gin, indicated at G.

Between the outer casing 3 and the head $1^b$ of drum 1 and enclosing the spider opening in casing 3 and the opening $1^c$ in head $1^b$ of drum 1, is a ring $1^f$, of felt, leather, or other suitable material, fast to the casing or the drum head, which serves to bridge the gap between the outer casing and the drum, being in contact with the casing and drum, and thus prevents possible leakage of air current into the space between the casing and the drum.

Preferably a portion of the inner surface of the drum 1 is protected against the impact of the air current within the drum by a shield, X, mounted upon hubs $x'$ on the shaft 11, the shaft rotating within the hubs and the shield being maintained in proper position by a depending counter-weight, W.

The drums are connected to rotate in unison by suitable pulleys $h$ and $h'$, and belt $h''$, and a screw conveyor, $c$, may be mounted beneath the screen, within the casing, and driven by pulley $c'$, to evacuate the dust and dirt removed from the cotton in the cleaning process.

On shaft 11 is mounted an eccentric $j$, actuating a rod $j'$, which engages a pivoted lever $j^2$, carrying a ratchet $j^3$, which engages and actuates in one direction a gear, $j^4$, on the end of the shaft of feed roll, $a'$. A second gear, $j^5$, on the other feed roll, $a^1$, meshes with gear $j^4$ to drive the feed rolls in unison.

The operation is as follows: Seed cotton being passed into the feeder-cleaner at, $a$, usually from a cotton chute under which the machine is disposed, the seed-cotton is engaged by the rollers, $a'$, $a'$, and slightly compressed and formed into a loose bat. The bat is received by the drum D, turning as indicated by the arrow, Figure 1, and moved by spikes, $d$, against the drum 1, rotating as indicated by the arrow, by the spikes, $d$, on which drum 1, the cotton is carried around opposite the screen 2 which begins, as shown, over the drum 1, and extends to the exit, $e$, of the casing of the feeder-cleaner.

While this is taking place the fan, F, is operated to create a current of rapidly moving air through pipe P to the interior of the drum where the air changing its direction of flow passes, in divided streams of rapidly moving air, through the perforations $1^e$.

In cotton cleaners as heretofore constructed, screen surface placed above the center of the drum has not been fully effective, as gravity tended to keep the cotton from contact with the screen and dirt and sand could not fall through the screen. In my new air blast cleaner, the rapid air current passing through the perforations, $1^e$, tends to lift the cotton, against gravity, to the upper screen surface against which it is actuated by the rotating drum, and sand and trash is blown through the upper screen as well as the other parts of the screen, out of the cotton, and finds its way to the bottom of the casing and the dirt evacuating means.

I have shown the air fan as delivering air to the drum 1. It is obvious that if desired air might in the same way be delivered to the drum D, that drum being perforated to permit of the designed action.

I prefer in the design of my air blast cleaner to make the combined area of the perforations in the peripheral walls of the drum equal to or slightly in excess of the area of the air inlet to the casing.

I claim:

1. In a cotton cleaner, the combination of a hollow rotary drum having a multiplicity of perforations in its peripheral walls and having its ends closed except for an air opening around the shaft; a screen adjacent to said drum to hold the cotton adjacent to said drum; an air fan; means to direct the air current from the discharge side of the fan through the end air opening to the interior of the drum, to cause the air current generated by the fan to pass through the peripheral perforations of the drum.

2. In a cotton cleaner, the combination of a hollow rotary drum having a multiplicity of perforations in its peripheral walls and having its ends closed except for an air opening around the shaft; a screen adjacent to said drum to hold the cotton adjacent to said drum; a casing enclosing and supporting the screen and drum and having a feed opening and an air opening; an air fan discharging air through the air opening of the casing and the drum, to cause the air current generated by the fan to pass through the peripheral perforations of the drum.

3. In a cotton cleaner, the combination of a hollow rotary drum having a multiplicity of perforations in its peripheral walls and having its ends enclosed except for an air opening around the shaft; a screen adjacent to said drum to hold the cotton adjacent to said drum; a casing enclosing the said screen and drum and having a feed opening and having bearings in its sides for the drum shaft, and an air opening in the casing adjacent to a bearing and opposite the drum end opening; an air fan; a conduit connecting the discharge side of the fan with the air opening of the casing, to cause the air current generated by the fan to pass to the drum and through the peripheral perforations of the drum.

4. In a cotton cleaner, the combination of a hollow rotary drum having a multiplicity of perforations in its peripheral walls and a multiplicity of spikes on the outer surface of its peripheral walls and having its ends closed except for an air opening around the shaft; a screen adjacent to said drum to hold the cotton adjacent to said drum; a casing enclosing the screen and drum, having a feed opening and an air opening, the air opening in the casing adjacent to a bearing and opposite the drum end opening; an air fan; a conduit connecting the discharge side of the fan with the air opening of the casing to cause the air current generated by the fan to pass to the drum and through the peripheral perforations of the drum.

Signed at Dallas, Texas, this 21st day of May, 1923.

JOHN H. McDONOUGH.